United States Patent [19]

Courbot

[11] Patent Number: 4,527,667
[45] Date of Patent: Jul. 9, 1985

[54] DISC BRAKE

[75] Inventor: Pierre Courbot, Villiers le Bel, France

[73] Assignee: Societe Anonyme D.B.A., Paris, France

[21] Appl. No.: 588,171

[22] Filed: Apr. 5, 1984

Related U.S. Application Data

[63] Continuation of Ser. No. 476,693, Mar. 18, 1983, abandoned, which is a continuation of Ser. No. 243,301, Mar. 13, 1981, abandoned.

[30] Foreign Application Priority Data

Mar. 18, 1980 [FR] France .............................. 80 05982

[51] Int. Cl.³ ............................................ F16D 65/09
[52] U.S. Cl. ............................... 188/73.34; 188/73.36; 188/73.38; 188/73.44
[58] Field of Search ............... 188/73.34, 73.35, 73.36, 188/73.38, 73.43, 73.44, 73.45; 411/513, 530; 24/517, 518, 542, 543, 544, 505

[56] References Cited

U.S. PATENT DOCUMENTS 4,034,858 7/1977 Path .............................. 188/73.36 X

FOREIGN PATENT DOCUMENTS 120370 9/1979 Japan ................................ 188/73.34
208404 4/1940 Switzerland ........................ 411/530
2039646 8/1980 United Kingdom ............. 188/73.34

Primary Examiner—George E. A. Halvosa
Attorney, Agent, or Firm—Larry J. Palguta; Ken C. Decker

[57] ABSTRACT

A disc brake includes a caliper (10) slidably mounted on a fixed carrier (12) by an axial pin (38). A locking element (46) extends axially between the caliper (10) and fixed carrier (12) to maintain the caliper in circumferential alignment with the fixed carrier. The locking element (46) is fixed to either the caliper or the fixed carrier so that it will not become separated therefrom when the caliper (10) is pivoted about the pin (38) connection and rotated away from the fixed carrier (12) for servicing of the parts, and provides a snap-- together engagement of the caliper and carrier. A ramp (90) provides an interference engagement with the locking element (46) when the caliper (10) is pivoted downwardly into operational position relative to the fixed carrier (12).

9 Claims, 7 Drawing Figures

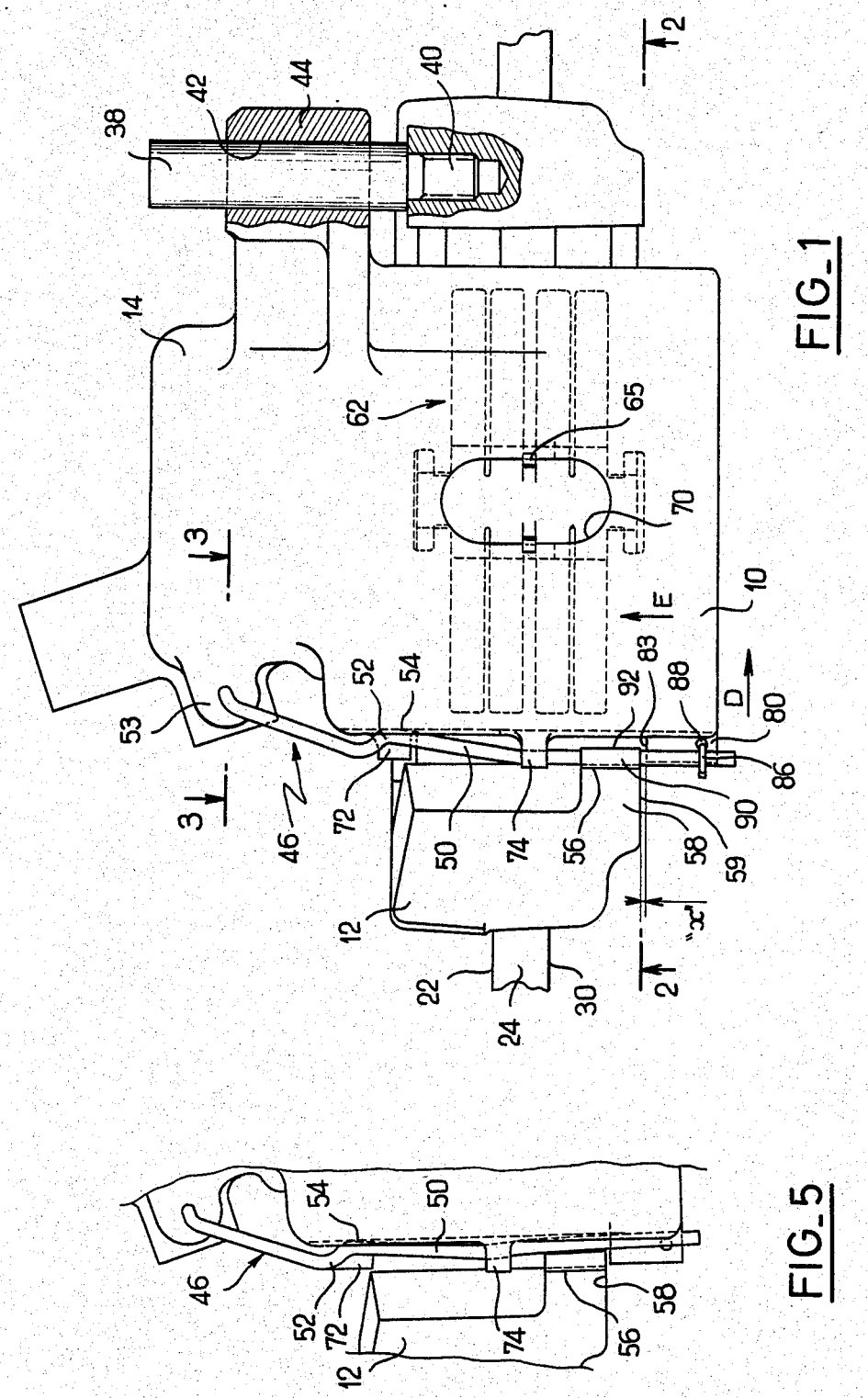

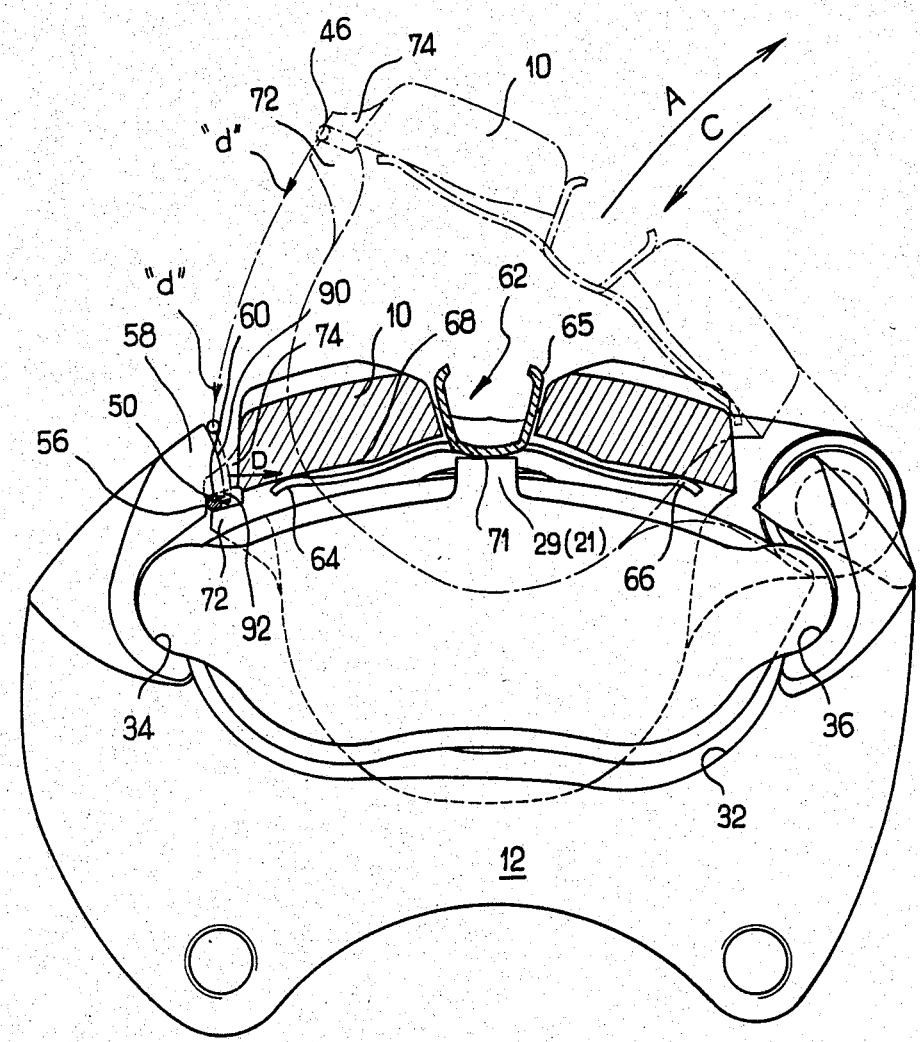
FIG_2

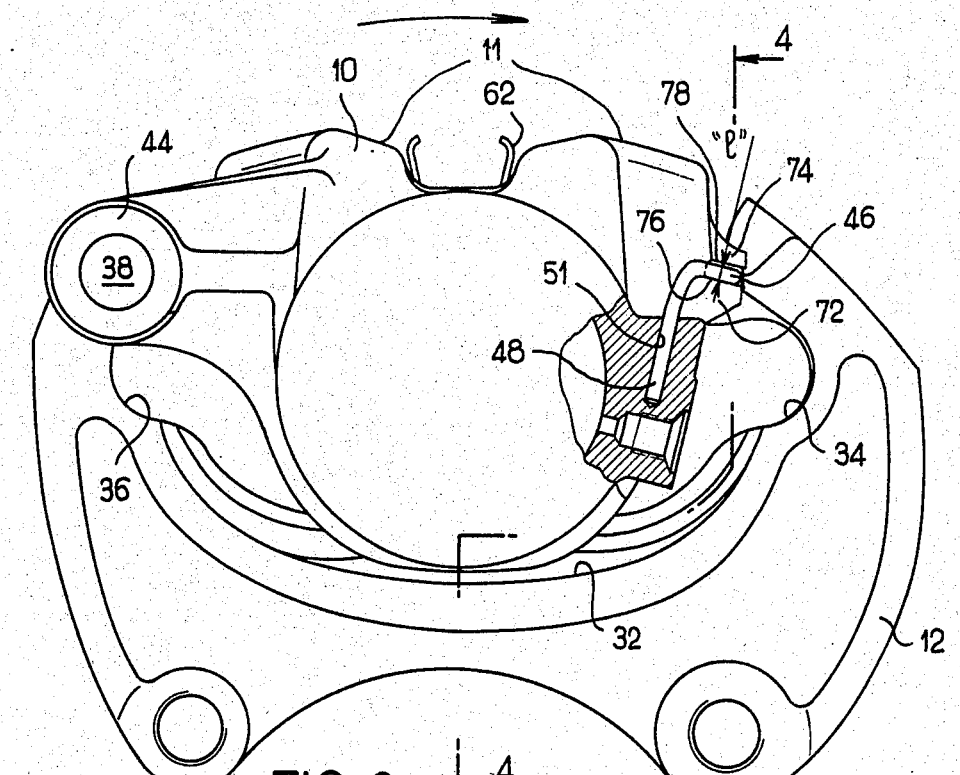
FIG._3
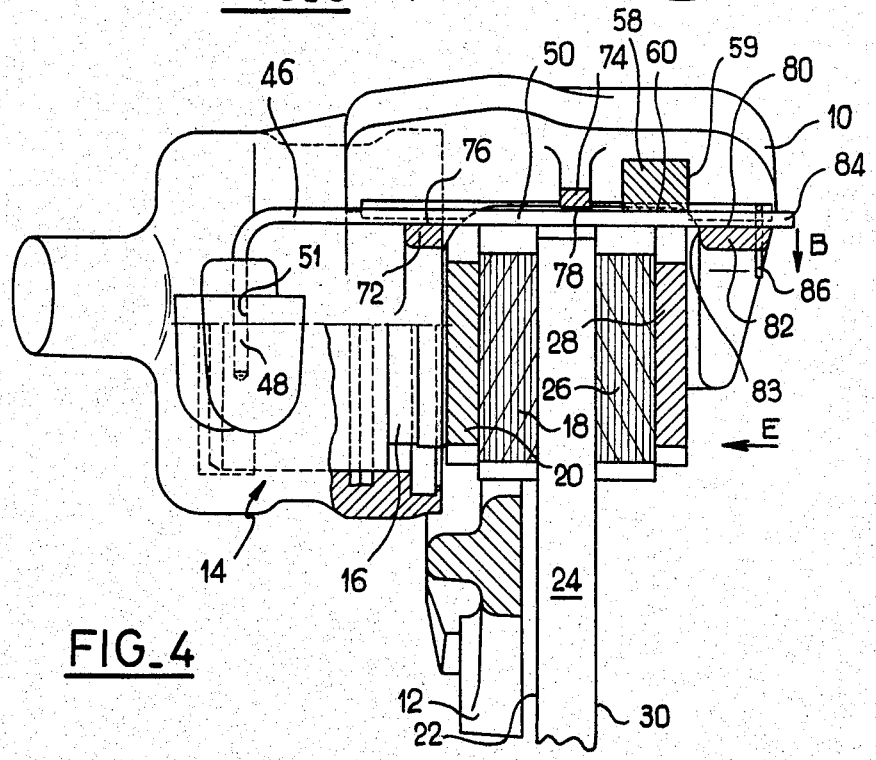
FIG._4

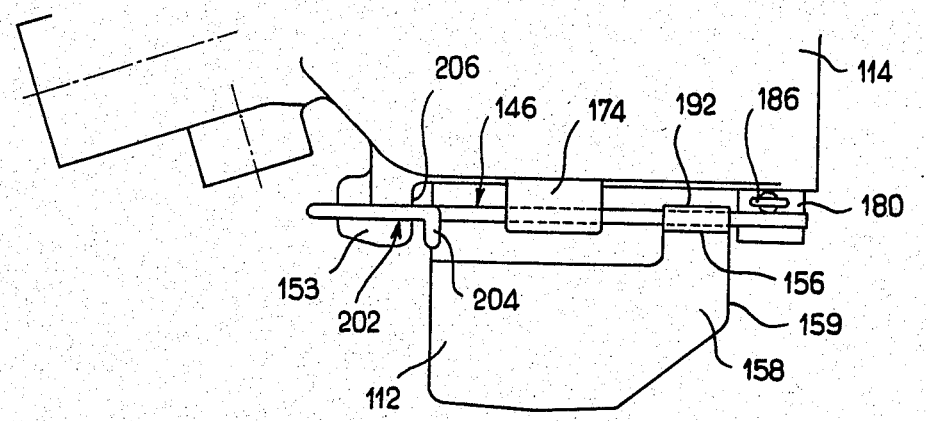
FIG_6
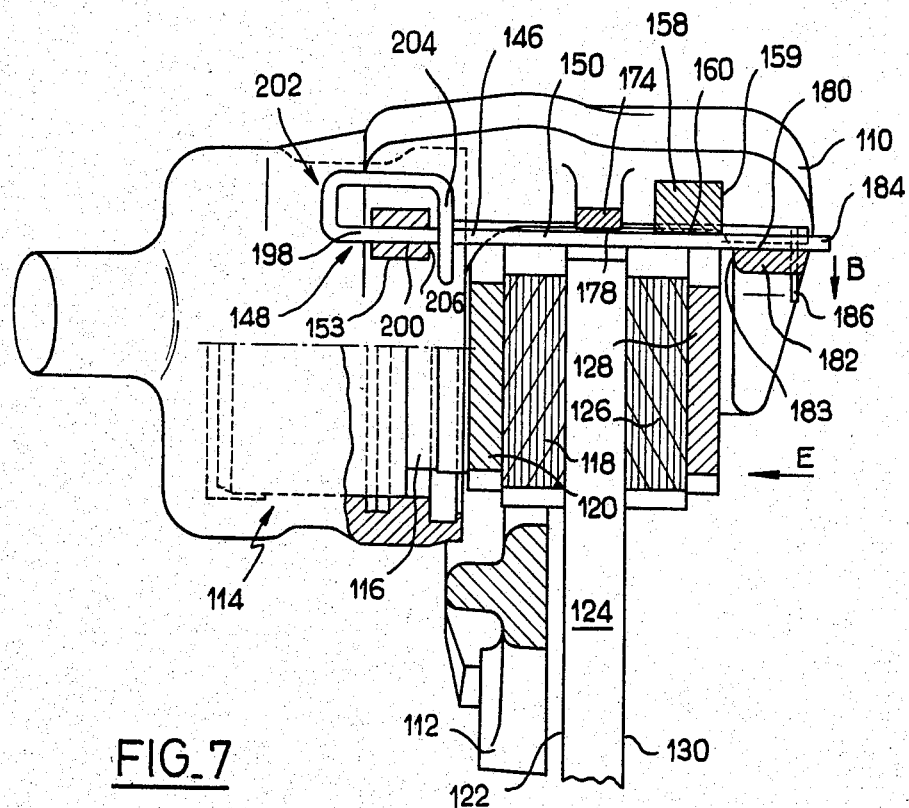
FIG_7

DISC BRAKE

This is a continuation of application Ser. No. 476,693, filed Mar. 18, 1983, which was a continuation of Ser. No. 243,301, filed Mar. 13, 1981, both abandoned.

The present invention concerns a disc brake.

More particularly the invention concerns a disc brake wherein the caliper is mounted slidably on a fixed carrier, in an opening in which two friction members are disposed in an anchored and axially slidable mode, the friction members being capable of coming into frictional engagement with the opposite faces of a rotary disc upon actuation of a brake actuator acting directly on one of the friction members and, by reaction by way of the sliding caliper, on the other friction member.

A disc brake of the above described type, is known wherein the caliper is mounted slidably on the fixed carrier by means of an axial pin which is fixed with respect to the fixed carrier and which co-operates with a facing bore formed in the caliper, and by means of two complementary flat surfaces for axial sliding movement, which are provided on the casing and on the fixed carrier, to facilitate relative movement of the caliper with respect to the fixed carrier, while opposing pivotal movement of the caliper about the sliding pin when the caliper is in its normal operating position. In this type of brake, the flat sliding surfaces are open to the weather and are liable to suffer from corrosion and accumulated fouling. Such corrosion on the surfaces gives rise to the danger of impairing good sliding movement of the caliper on the fixed carrier and thus detrimentally affecting proper operation of the brake.

In order to remedy these disadvantages, it has been proposed to interpose between the complementary sliding surfaces, a removable sliding key which facilitates the sliding movement of the caliper on the fixed carrier and which opposes accidental pivotal movement of the caliper about the pin, a spring also being provided to hold the sliding surfaces in contact with the opposite faces of the key.

However, in that brake, replacing the friction members is a complicated operation which requires dismantling of the guide key by axial translatory movement thereof, after having removed the two safety pins which are normally associated therewith.

The invention proposes a disc brake of the type just described above, in which the complementary sliding surfaces and the guide key are placed by a locking element which extends axially between the caliper and the fixed carrier, for co-operating in guiding the caliper.

For this purpose, the invention proposes a disc brake wherein the caliper is mounted slidably on a fixed carrier by means of an axial pin which is fixed with respect to the caliper or the fixed carrier and which co-operates with a corresponding bore in the fixed carrier or the caliper, a locking element extending axially between said caliper and said fixed carrier for co-operating in guiding the caliper on the fixed carrier and opposing pivotal movement thereof about said pin when it is in its normal operating position, and being capable of being rendered inoperative when said caliper is to be pivoted for access to the friction members, characterized in that said locking element is mounted on the fixed carrier or on the caliper, to be resiliently maintained in a plane parallel to a plane substantially tangent to the outside circumference of the caliper, in vis a vis of a recessed portion which is formed in the caliper or in the fixed carrier and which comprises a bearing surface which extends axially for preventing the locking element from escaping radially.

In accordance with another feature of the invention, the locking element comprises an elongate resilient element which is mounted on the fixed carrier or to the caliper by means of one of its ends.

The disc brake being the subject of the present invention thus permits the friction members to be very easily replaced and affords every guarantee in respect of reliability in regard to correct re-assembly of all the components of the brake, replacement of the friction members requiring the dismantling of no component of the brake except for the friction members themselves.

The invention will now be described by way of example with reference to the accompanying drawings in which:

FIG. 1 is a plan view of a first embodiment of a disc brake constructed in accordance with the teaching of the present invention;

FIG. 2 is a view in section taken along line 2—2 in FIG. 1, showing the steps in assembly of the brake;

FIG. 3 is a view in partial section taken along line 3—3 in FIG. 1;

FIG. 4 is a view in section along line 4—4 in FIG. 3;

FIG. 5 is a detail view showing the locking element of the disc brake shown in FIG. 1, in a particular position that it occupies upon assembly of the brake;

FIG. 6 is a partial view of a second embodiment of the locking member of the disc-brake; and FIG. 7 is a view similar to FIG. 4, showing the mounting of the locking member of FIG. 6.

The disc brake shown in FIGS. 1 to 5 comprises a movable caliper or frame member 10 which is mounted slidably on a fixed carrier member 12. Control means which, in the embodiment illustrated, are formed by a hydraulic brake actuator 14, are associated with the caliper 10 and are so disposed as to urge a friction member 18 comprising a carrier plate 20 directly by mean of a piston 16 against a first face 22 of a brake disc 24 associated with a wheel (not shown) of the vehicle. By reaction, when the brake actuator 14 and the piston 16 thereof are actuated, the caliper 10 is displaced axially and urges a second friction member 26 comprising a carrier plate 28 against the second face 30 of the brake disc 24.

As can be seen in particular from FIGS. 2 and 3, the fixed carrier 12 is provided with an opening 32, the circumferentially spaced edges 34 and 36 of which support the carrier plates 20 and 28 of the friction members 18 and 26 in an anchored and slidable mode, so that the fixed carrier 12 forms a torque carrier member for the friction members.

The caliper 10 is mounted slidably on the fixed carrier 12 by means of an axial pin 38. In the embodiment illustrated, and as can be seen more particularly from FIG. 1, the pin 38 is fixed with respect to the fixed carrier 12 by a screwthread connection 40. The pin 38 is slidably received in a bore 42 formed in an arm 44 of the caliper 10.

In accordance with the invention, the assembly includes a locking element 46 which extends axially between the caliper 10 and the fixed carrier 12, for co-operating in guiding the caliper on the fixed carrier. In the embodiment illustrated, the locking element 46 is formed by a resilient element made from a cylindrical metal spring wire. The main leg 50 of the locking element 46 extends in a plane which is parallel to a plane substantially tangent to the outside circumference 11 of the caliper 10. The locking element 46 is fixed to the caliper 10 by means of one of its ends 48. The end 48 of the locking element 46 is at an angle substantially equal to 90°, to the main leg 50 of the locking element (see FIG. 4) and is a force fit in a bore 51 formed in a projecting portion 53 of the caliper. As can be seen from FIG. 1, the main leg 50 of the locking element 46 has a bent portion 52 which is substantially of S-shaped configuration in said plane. The locking element 46 bears by means of its bent portion 52 against an edge 54 of the caliper which is formed facing the bent portion 52, and is urged resiliently in said above-defined plane, towards a recessed portion 56 formed on an arm 58 of the fixed carrier 12. By means of the resilient action of the main leg 50 of the locking member 46, this latter is maintained in vis à vis of the recessed portion when the brake components are in their operative position. The recessed portion 56 comprises a flat bearing face 60 which extends parallel to the axis of the disc 24. In the embodiment illustrated, the main leg 50 of the locking element 46 is held in contact with the surface 60 by means of a spring 62. The spring 62 is a spring made of metal plate, which is fixed to the caliper 10 and which bears against the friction members 18 and 26. The ends 64 and 66 of the limbs of the spring 62 bear against the inside surface 68 of the roof portion of the caliper 10 so as to distribute the bearing force irrespective of any defect in respect of the shape of the roof portion of the caliper 10 by means of its central portion 65 which is resiliently engaged into an opening 70 in the roof position of the caliper 10. The spring 62 is thus fixed to the caliper and remains fixed thereto when the brake is dismantled. As can be seen from FIG. 2, the spring 62 bears against the central portion 21 and 29 of the upper outer edges of the carrier plates 20 and 28 of the friction members and urges the caliper 10 in the direction indicated by arrow A. It will be appreciated therefore that the spring 62 has a double function, firstly, to hold the main leg 50 of the locking element 46 in contact with the surface 60, and secondly, to act as an anti-noise spring in respect of the friction members 18 and 26. In fact, the central portion 71 of the spring 62 urges the carrier plates 20 and 28 against the anchoring and sliding surfaces 34 and 36 and thus opposes any parasitic vibration which may occur as between the friction members and the fixed carrier.

In accordance with the invention, the flat bearing surface 60 prevents the locking element 46 from escaping radially, in the direction indicated by arrow A in FIG. 2, and thus opposes pivotal movement of the caliper around the axial pin 38 under the effect of the force which is applied thereto by the spring 62, when the locking element 46 is in its normal operating position as shown in particular in FIG. 1.

In accordance with the invention, means are provided for holding the element 46 in the above-defined plane and permitting movement thereof in that plane. Such means comprise two flat surfaces 76 and 78 which are formed on two projections 72 and 74 respectively which are integral with the caliper 10 and which extend from the periphery thereof.

As shown in particular in FIGS. 2 and 3, the surfaces 76 and 80 are parallel to the plane of movement of the locking element 46 and are spaced by a distance "l" which is slightly greater than the diameter of the wire forming the locking element 46, in order to permit displacement thereof between the surfaces 76 and 78. When the caliper is in its normal operating position, the holding surfaces 76 and 78 are parallel to the surface 60 formed on the arm 58 of the fixed carrier (see FIG. 4).

In order to prevent excessive deformation of the leg 50 of the locking element 46, provided on the caliper 10 is an abutment surface 80 which extends parallel to the surfaces 76 and 78 and which is formed on an additional projection 82 which is integral with the caliper 10. By virtue of the surface 80, the end 84 of the leg 50 cannot be deformed in the direction indicated by arrow B in FIG. 4. This therefore prevents the locking element 46 from accidentally escaping, under the effect of the force applied to the caliper 10 by the spring 62. As a safety precaution, the arrangement also includes a safety retaining pin 86 which immobilises the end 84 of the leg 50 relative to the projection 82. The pin 86 is mounted resiliently in an aperture 88 in the projection 82.

The disc brake shown in FIGS. 1 to 5 is fitted with new frictions members. Under such conditions, and as can be seen from FIG. 1, there is a functional clearance "x" between the side edge 59 of the arm 58 and the side edge 83 of the additional projection 82. This functional clearance is intended to permit the caliper 10 to pivot about the axial pin 38 when the brake is assembled. After the brake has been applied several times, progressive wear of the friction member 26 will cause the caliper 10 to be progressively moved in the direction indicated by arrow E (see FIGS. 1 and 4), with the edge 82 thus being displaced in the same direction. Because of this displacement, the side edge 83 and the surface 80 progressively comes to a position facing the flat surface 60 formed on the projection. It will be seen that this therefore prevents the caliper 10 from accidentally escaping, in the direction indicated by arrow A, even in the event of the locking element 46 breaking.

Referring now to FIG. 2, it is noted that the limb 58 of the fixed carrier 12 is provided with a ramp 90. The ramp 90 is intended to cause displacement of the leg 50 of the locking element 46, against its inherent resiliency, when the caliper is pivoted towards its normal operating position, about the axial pin 38. The ramp 90 extends substantially in a radial plane which passes through the outside edge 92 of the surface 60 of the projecting portion 56.

The brake is assembled in the following manner; after the friction members 18 and 26 have been fitted to the sliding surface 34 and 36 of the fixed carrier 12, the free end of the axial pin 38 is introduced into the bore 42 formed in the arm 44 of the caliper 10. The caliper 10 is then slid on to the pin 38 until the latter is disposed above the friction members. Then, by virtue of the operating clearance x, the caliper can be pivoted about the pin 38 in the direction indicated by arrow C in FIG. 2; in that pivotal movement, and as indicated by means of the arrows d, the locking element 46 describes a portion of a circle, to come into contact with the upper portion of the ramp 90. A the same moment, the central portion 70 of the spring 62 comes into contact with the upper central portions of the carrier plates 20 and 28 of the friction members 18 and 26. The operator must then apply an additional force to the roof portion of the caliper 10 in the direction indicated by the arrow C in order to compress the spring 62 and to cause the main leg 50 of the element 46 to move along the ramp 90, in the direction indicated by arrow D. Because of the combined displacement of the leg 50 in directions C and D, the leg 50 of the element 46 is moved into its limit position shown in FIG. 5, which it occupies before the caliper reaches its normal operating position, that is to say, before the leg 50 comes into contact with the bearing surface 60, and thus locks the caliper in its operating position. In that position, the leg 50 is urged resiliently against the edge 56 and is held in contact with the surface 60 by the force of the spring 62. It then only remains for the safety retaining pin 86 to be fitted into the aperture 88 in the caliper 10.

When the operator wishes to replace the friction members, he proceeds in the following manner: after the pin 86 has been removed, the operator urges the leg 50 of the locking element 46 in the direction indicated by arrow D; by acting thereon at a point between the projection 74 and the limb 58 of the fixed carrier, by means of a suitable tool (not shown), by bearing against the carrier 12. Under the effect of the above indicated force, the leg 50 follows the opposite path from that indicated by arrows d. This movement occurs automatically under the effect of the resilient force due to the spring 62 as soon as the leg 50 has passed beyond the end edge 92 of the ramp 90. The operator can then pivot the caliper fully in the direction indicated by arrow A and proceed with replacing the friction members. When the friction members have been replaced, the operator only has to pivot the caliper in the direction indicated by the arrow C in the manner described hereinbefore, after having pushed the piston 16 back into its bore.

In normal operation, and as can be seen in particular from FIG. 2, when the caliper 10 slides on the axial pin 38, the leg 50 slides on the support surface 60. It will be appreciated that in this way the frictional forces are limited to the co-operation of the outside generatrix of the leg 50, against the surface 60. The contacting surface areas are thus reduced and give rise to only little danger of corrosion.

The second embodiment shown on FIGS. 6 and 7 only differs from the first embodiment by the mounting of the end of the locking element. The elements of FIGS. 6 and 7 which are identical or equivalent to those of FIGS. 1 to 5, are designated by the same reference numerals plus 100.

The end 148 of the locking element 146 is composed of a cylindrical portion 198 of the metallic wire, which is set in a corresponding receiving bore 200 formed in the projecting portion 153 of the caliper 114. The end 148 of the locking element 146 is therefor set in bore 200, and consequently, the locking element acts as a contilevered girder and is resiliently maintained in vis a vis of the recessed portion 156. According to an other feature of the invention, the end 148 of the locking element 146 is provided with anchoring means 202 co-operating with the projecting portion 153 in order to prevent any accidental escape of the cylindrical portion 198 out of the receiving bore 200. The anchoring means 202 are composed of a loop formed at the end of raid cylindrical portion 198. The end branch 204 is capable of cooperating with a lateral face 206 of the projecting portion 153 to prevent from said escape.

It will be appreciated that the invention is not limited to the embodiments described hereinbefore. In particular, the element 46 can be fixed to the fixed carrier 12, in which case the ramp 90 will have to be provided on the caliper 10. In an alternative form, and when the arrangement does not include a caliper spring of the spring 62 type, the recessed portion 56 may have a second bearing surface which makes it possible to prevent the caliper from falling in the direction indicated by arrow C.

I claim:

1. A disc brake having a caliper assembly rotatable relative to a fixed carrier assembly and providing a snap-together engagement of the assemblies to retain the caliper assembly in circumferential alignment with the fixed carrier assembly, comprising a fixed carrier assembly having an opening receiving friction elements and a caliper assembly therein, a rotatable disc adjacent the fixed carrier assembly, the caliper assembly disposed in said opening and in alignment with said friction elements and the disc, resilient means coupled to said caliper and disposed between the caliper assembly and friction elements whereby the resilient means biases the caliper assembly radially outwardly and the friction elements radially inwardly when the caliper assembly is in operative position relative to the carrier assembly, an axial pin connecting the assemblies to provide slidable axial movement of the caliper assembly relative to the fixed carrier assembly, a recessed retention bearing surface disposed on said fixed carrier assembly and extending axially relative thereto, an arcuate surface terminating at the recessed retention bearing surface, and resilient locking element means for providing said snap-together engagement which prevents pivotal movement of the caliper assembly about said axial pin when the caliper assembly is in operative position whereby the friction elements may be moved into engagement with the disc, the resilient locking element means extending substantially axially between said assemblies to permit said axial movement therebetween and fixedly mounted to said caliper assembly to prevent inadvertent separation of the locking element means therefrom when the caliper assembly is pivoted relative to the fixed carrier assembly, the locking element means maintained in a plane parallel to a plane substantially tangent to the outer circumference of the caliper assembly and remaining substantially fixed in an axial direction relative to the caliper assembly while providing for slidable engagement in the axial direction with the fixed carrier assembly, the locking element means including a central axial portion located between said caliper assembly and carrier assembly and for engaging said arcuate surface and to resiliently deform until the portion rebounds into engagement with said bearing surface, whereby the caliper assembly is pivotable about the pin connection so that said central axial portion engages said arcuate surface and is resiliently deformed thereby to provide a snap-together engagement with said recessed retention bearing surface when said caliper assembly is pivoted into operative position relative to the fixed carrier assembly, the resilient means maintaining the engagement of the resilient locking element means with the retention bearing surface which retains the caliper assembly in said circumferential alignment.

2. The disc brake in accordance with claim 1, wherein said resilient locking element means includes an elongated end which fixes said element to said caliper assembly.

3. The disc brake in accordance with claim 1, wherein said pin maintains said resilient locking element means in the parallel plane and permits displacement of the locking element means parallel to said plane.

4. The disc brake in accordance with claim 1, further comprising extension abutment means formed on said caliper assembly to maintain the resilient locking element means in position.

5. The disc brake in accordance with claim 4 wherein said extension abutment means is parallel to said tangent plane and located to permit axial movement of the resilient locking element means.

6. The disc brake in accordance with claim 5, wherein said extension abutment means is integral with said caliper assembly and extends from the periphery thereof.

7. The disc brake in accordance with claim 1, further comprising a receiving bore formed in said caliper, the receiving bore receiving an end of the resilient locking element means.

8. The disc brake in accordance with claim 2, further comprising anchoring means disposed at said end of the resilient locking element means, the anchoring means cooperating with said receiving bore to prevent displacement of the locking element means from the bore.

9. The disc brake in accordance with claim 8, wherein said anchoring means comprises a loop formed at said end of the resilient locking element means.

* * * * *